United States Patent
Fairfield et al.

(10) Patent No.: US 10,691,131 B2
(45) Date of Patent: Jun. 23, 2020

(54) DYNAMIC ROUTING FOR AUTONOMOUS VEHICLES

(71) Applicant: Waymo LLC, Mountain View, CA (US)

(72) Inventors: Nathaniel Fairfield, Mountain View, CA (US); Joshua Seth Herbach, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/029,922

(22) Filed: Jul. 9, 2018

(65) Prior Publication Data

US 2019/0004527 A1    Jan. 3, 2019

Related U.S. Application Data

(63) Continuation of application No. 15/355,658, filed on Nov. 18, 2016, now Pat. No. 10,042,362.

(51) Int. Cl.
*G05D 1/02*    (2020.01)
*G01C 21/34*   (2006.01)
(Continued)

(52) U.S. Cl.
CPC ........... *G05D 1/0217* (2013.01); *G01C 21/20* (2013.01); *G01C 21/3407* (2013.01);
(Continued)

(58) Field of Classification Search
USPC ....................................................... 701/411
See application file for complete search history.

(56) References Cited

U.S. PATENT DOCUMENTS

| 6,393,362 | B1 | 5/2002 | Burns |
| 7,054,742 | B2 | 5/2006 | Khavakh et al. |

(Continued)

FOREIGN PATENT DOCUMENTS

| KR | 20080057634 A | 6/2008 |
| WO | 2015129366 A1 | 9/2015 |

OTHER PUBLICATIONS

International Search Report and Written Opinion dated Mar. 8, 2018, for International Application No. PCT/US2017/061478. 14 pages.

(Continued)

*Primary Examiner* — Tyler D Paige
(74) *Attorney, Agent, or Firm* — Botos Churchill IP Law

(57) ABSTRACT

A route for a trip to a destination is generated using map information. A set of no-go roadway segments, where the vehicle is not able to drive in an autonomous mode, relevant to the route from the plurality of no-go roadway segments is identified from the map information. A local region around a current location of the vehicle is determined. A local map region including roadway segments of the map information that correspond to locations within the local region is determined. The set of the plurality of no-go roadway segments is filtered from the roadway segments of the local map region. A cost value is assigned to each roadway segment of the filtered roadway segments of the local map region. Any assigned cost values are used to determining a plan for maneuvering the vehicle for a predetermined period into the future. The vehicle is maneuvered according to the plan.

20 Claims, 18 Drawing Sheets

(51) Int. Cl.
  *G08G 1/0968* (2006.01)
  *G01C 21/20* (2006.01)
  *G01C 21/36* (2006.01)

(52) U.S. Cl.
  CPC ..... *G01C 21/3461* (2013.01); *G01C 21/3469* (2013.01); *G01C 21/3667* (2013.01); *G08G 1/096833* (2013.01)

(56) References Cited

U.S. PATENT DOCUMENTS

| | | | |
|---|---|---|---|
| 8,762,056 B2 | 6/2014 | Forstall et al. | |
| 9,097,549 B1 | 8/2015 | Rao et al. | |
| 9,188,985 B1 | 11/2015 | Hobbs et al. | |
| 9,244,461 B2 | 1/2016 | Tanaka et al. | |
| 9,672,734 B1* | 6/2017 | Ratnasingam | G08G 1/0112 |
| 10,042,362 B2* | 8/2018 | Fairfield | G08G 1/096833 |
| 2009/0204320 A1* | 8/2009 | Shaffer | G01C 21/3415 701/533 |
| 2010/0023251 A1 | 1/2010 | Gale et al. | |
| 2013/0253826 A1 | 9/2013 | Tava | |
| 2014/0207325 A1* | 7/2014 | Mudalige | B62D 15/025 701/26 |
| 2014/0278052 A1 | 9/2014 | Slavin et al. | |
| 2015/0339826 A1 | 11/2015 | Buibas et al. | |
| 2015/0345967 A1 | 12/2015 | Meuleau | |
| 2016/0341561 A1* | 11/2016 | Woolley | G01C 21/3658 |
| 2016/0347327 A1 | 12/2016 | Kondo et al. | |
| 2016/0370194 A1 | 12/2016 | Colijn et al. | |
| 2017/0120803 A1 | 5/2017 | Kentley et al. | |
| 2018/0143643 A1* | 5/2018 | Fairfield | G01C 21/20 |

OTHER PUBLICATIONS

Singapore Search Report and Written Opinion for Application No. 11201903779T dated Feb. 6, 2020.

* cited by examiner

DYNAMIC ROUTING FOR AUTONOMOUS VEHICLES

CROSS-REFERENCE TO RELATED APPLICATIONS

The present application is a continuation of U.S. patent application Ser. No. 15/355,658, filed Nov. 18, 2016, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

In addition to using sensors, these vehicles may rely on highly detailed maps of their environment. These maps are critical for both navigation, for instance determining how to get between two locations) as well as localization (determining where the vehicle is in the world.

BRIEF SUMMARY

Aspects of the disclosure provide a method for maneuvering a vehicle. The method includes generating, by one or more processors, a route for a trip from a first location to a destination using map information, the map information including roadway segments defining the shape and location of roadways, the map information also identifying at least one no-go roadway segment defining roadway segments where the vehicle is not able to drive in an autonomous mode; identifying, by the one or more processors, from the map information, a set of no-go roadway segments relevant to the route from the plurality of no-go roadway segments; determining, by the one or more processors, a local region around a current location of the vehicle; identifying, by the one or more processors, a local map region including roadway segments of the map information that correspond to locations within the local region; filtering, by the one or more processors, the set of the plurality of no-go roadway segments from the roadway segments of the local map region; assigning, by the one or more processors, a cost value to each roadway segment of the filtered roadway segments of the local map region; using, by the one or more processors, any assigned cost values to determining a plan for maneuvering the vehicle for a predetermined period of time into the future; and maneuvering, by the one or more processors, the vehicle according to the plan.

In one example, the method also includes identifying at least one additional no-go roadway segment which would not allow the vehicle to reach the destination using a graph walk starting from the destination, and the set of no-go roadway segments includes the at least one no-go roadway segment as well as at least one additional roadway segment. In another example, the local map region is identified by performing a graph cut on the map information. In another example, the local region corresponds to an area that the vehicle could reach from the current location of the vehicle within a second pre-determined period of time into the future. In another example, the local region is determined periodically and the set of no-go roadway segments are identified only once for the trip. In another example, a cost value is assigned to a roadway segment of the filtered roadway segments of the local map region based on a construction area corresponding to the roadway segment. In another example, a cost value is assigned to a roadway segment of the filtered roadway segments of the local map region based on an unprotected left turn corresponding to the roadway segment. In another example, a cost value is assigned to a roadway segment of the filtered roadway segments of the local map region based on a time to reach the destination from the roadway segment. In another example, the method also includes storing at least one assigned cost value in a local cache; determining a second local region at least partially overlapping with the local region; identify a second local map region including roadway segments of the map information that correspond to locations within the second local region; filter the set of the plurality of no-go roadway segments from the roadway segments of the second local map region; assigning a cost value to each roadway segment of the filtered roadway segments of the second local map region by retrieving the at least one assigned cost value from the local cache; using any assigned cost values for each roadway segment of the filtered roadway segments of the second local map region to determining a second plan for maneuvering the vehicle for a second predetermined period into the future; and maneuvering the vehicle according to the second plan. In another example, the plan includes a set of connected roadway segments of the filtered roadway segments of the local map region that lead out of the local region and have a lowest accumulation of cost values. In another example, determining the plan includes determining whether a lane change for the vehicle should be forced. In another example, determining the plan includes determining whether a turn should be executed to move the vehicle between two lane roadway segments. In another example, determining the plan includes identifying a secondary path when a primary path corresponding to the roadway segments of the route is not available.

Another aspect of the disclosure provides a system for maneuvering a vehicle. The system includes one or more processors configured to generate a route for a trip from a first location to a destination using map information, the map information including roadway segments defining the shape and location of roadways, the map information also identifying a plurality of no-go roadway segments defining roadway segments where the vehicle is not able to drive in an autonomous mode; identify a set of no-go roadway segments relevant to the route from the plurality of no-go roadway segments; determine a local region around a current location of the vehicle; identify a local map region including roadway segments of the map information that correspond to locations within the local region; filter the set of the plurality of no-go roadway segments from the roadway segments of the local map region; assign a cost value to each roadway segment of the filtered roadway segments of the local map region; use any assigned cost values to determining a plan for maneuvering the vehicle for a predetermined period into the future; and maneuver the vehicle according to the plan.

In one example, the one or more processors are further configured to identify at least one additional no-go roadway segment which would not allow the vehicle to reach the destination using a graph walk starting from the, and the set of no-go roadway segments includes the at least one no-go roadway segment as well as the at least one additional roadway segment. In another example, the local region is determined periodically and the set of no-go roadway segments are identified only once for the trip. In another example, a cost value is assigned to a roadway segment of the filtered roadway segments of the local map region based on a construction area corresponding to the roadway segment. In another example, a cost value is assigned to a roadway segment of the filtered roadway segments of the local map region based on an unprotected left turn corresponding to the roadway segment. In another example, a cost value is assigned to a roadway segment of the filtered roadway segments of the local map region based on a time to reach the destination from the roadway segment.

A further aspect of the disclosure provides a non-transitory, computer readable medium on which instructions are stored. The instructions, when performed by one or more processors, cause the one or more processors to perform a method for maneuvering a vehicle. The method includes generating a route for a trip from a first location to a destination using map information, the map information including roadway segments defining the shape and location of roadways, the map information also identifying a plurality of no-go roadway segments defining roadway segments where the vehicle is not able to drive in an autonomous mode; identifying a set of no-go roadway segments relevant to the route from the plurality of no-go roadway segments; determining a local region around a current location of the vehicle; identifying a local map region including roadway segments of the map information that correspond to locations within the local region; filtering the set of the plurality of no-go roadway segments from the roadway segments of the local map region; assigning a cost value to each roadway segment of the filtered roadway segments of the local map region; using any assigned cost values to determining a plan for maneuvering the vehicle for a predetermined period into the future; and maneuvering the vehicle according to the plan.

DETAILED DESCRIPTION

Overview

Figure 1:
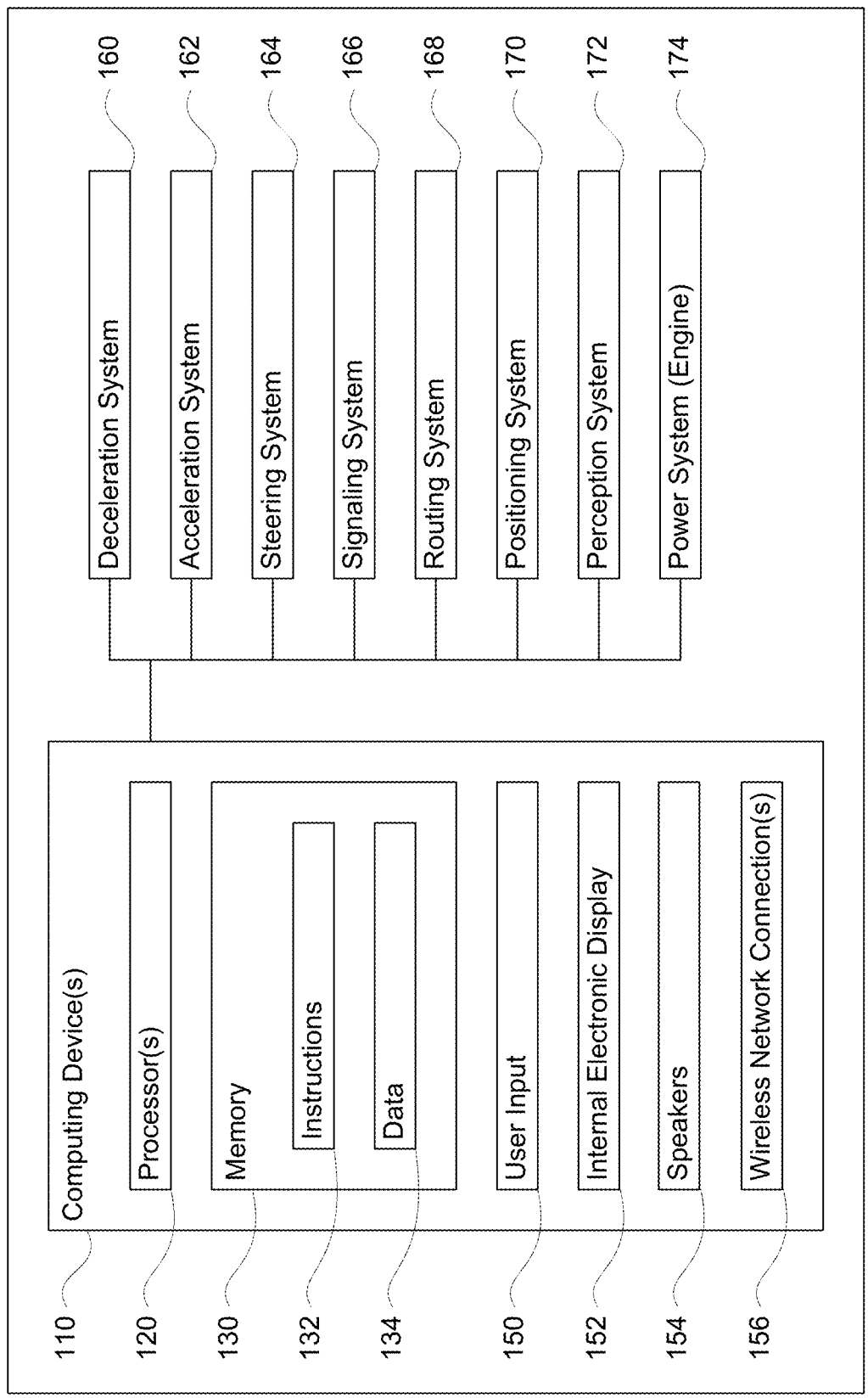
FIG. 1 is a functional diagram of an example vehicle in accordance with aspects of the disclosure.

The technology relates to planning a route for an autonomous vehicle. For example, an autonomous vehicle may be controlled by a computing system that includes both a routing or navigation system for generating a route to a destination (in other words the long-term planning) and a planning system for generating a path along the route (in other words the short-term planning). The routing system determines a route by referring to a roadgraph and identifying a series of road or lane segments (lane id, start, end) that connect the vehicle's current location with the destination location. The planning system then uses this route as a baseline to determine which turns to make, what lanes to be in, etc. in order to reach the destination. By allowing the planning system to generate a path which does not follow the route, the vehicle is able to be controlled in a way that makes it more reactive to the vehicle's current environment.

In order to generate a route, the routing system must have access to map information. The map information may describe the shape and orientation of road features such as the road surface, lane markers, curbs, crosswalks, etc. As indicated above, roadways may be defined by segments within lanes identified by identifiers, starting points and ending points. By connecting segments together, a route between two locations can be generated. To avoid certain areas, such as those where the vehicle is not able to drive safely (due to speed constraints on the vehicle, a dangerous area, because the segments have not been sufficiently mapped, or other reasons), the map information may include segments on which the vehicle is not able to travel on or "no-go regions."

Once a route is identified, all relevant no-go regions for the destination may be identified. A simple graph walk may be used starting from the destination towards the starting location (typically, the current location of the vehicle). Essentially, this assumes that the destination remains constant and identifies all segments which would not get the vehicle to the destination. No other detailed analysis is required at this point, and thus, this determination may be done only once per a destination.

Using the current location of the vehicle, a local region around the vehicle may be identified. This local region may include some small region behind the vehicle as well as the area in front (in the direction of travel) and around (in the lateral directions from) the vehicle. For instance, the local region may correspond to all areas that the vehicle could possibly reach within some predetermined period of time. This local region may be identified periodically.

The local region may then be used to perform a simple graph cut, in other words, defining a periphery using to separate a map region from the rest of the map information. Alternatively, segments of the map information may be identified by doing a simple graph walk within the area of the region. Any previously identified no-go regions are then removed from the map region to obtain a filtered map region.

All remaining segments in the filtered map region are then assigned a cost value. Costs may be assigned based on a priori knowledge about the vehicle's environment, for instance, from data in the map information. Because there will be significant overlap between regions for many of the cost values, this information may be stored in local cache for quick retrieval.

The cost values may then be provided to the planner system in order to determine how to maneuver the vehicle. For instance, the vehicle's computing devices may determine the lowest cost set of segments that lead out of the local region. The result may be used to plan how to control the vehicle for a brief period into the future.

Because the planner system will determine a new plan several times per second, many of the cost values may simply be retrieved from the local cache. Those that are likely to change when the vehicle moves within the local region (such as those relating to the time to destination, etc.) may be recalculated as needed. In addition, all or less than all of the cost values may be recalculated when a new local region is calculated.

By using the cost values as described above, the vehicle's computing devices may make better informed decisions about whether to weave around or pass a slow moving or stopped object. Thus, the features described herein allow a vehicle's computing devices to make better more well-informed decisions about how to control the vehicle in real time. For instance, the routing system can determine whether a lane change should be forced, if a multi-point turn should be executed to move between two lane segments, or if a secondary path should be used if the primary path is not available. This greatly improves and increases the vehicle's available responses to immediate environmental conditions, allowing the planner system to quickly and efficiently find the best path to the destination. In addition, by limiting the cost value calculations in this way and only identifying all the relevant no-go regions once per destination, this dramatically increases the efficiency of the routing and planning systems described above.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160, acceleration system 162, steering system 164, signaling system 166, routing system 168, positioning system 170, and perception system 172 in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

Figure 2A:
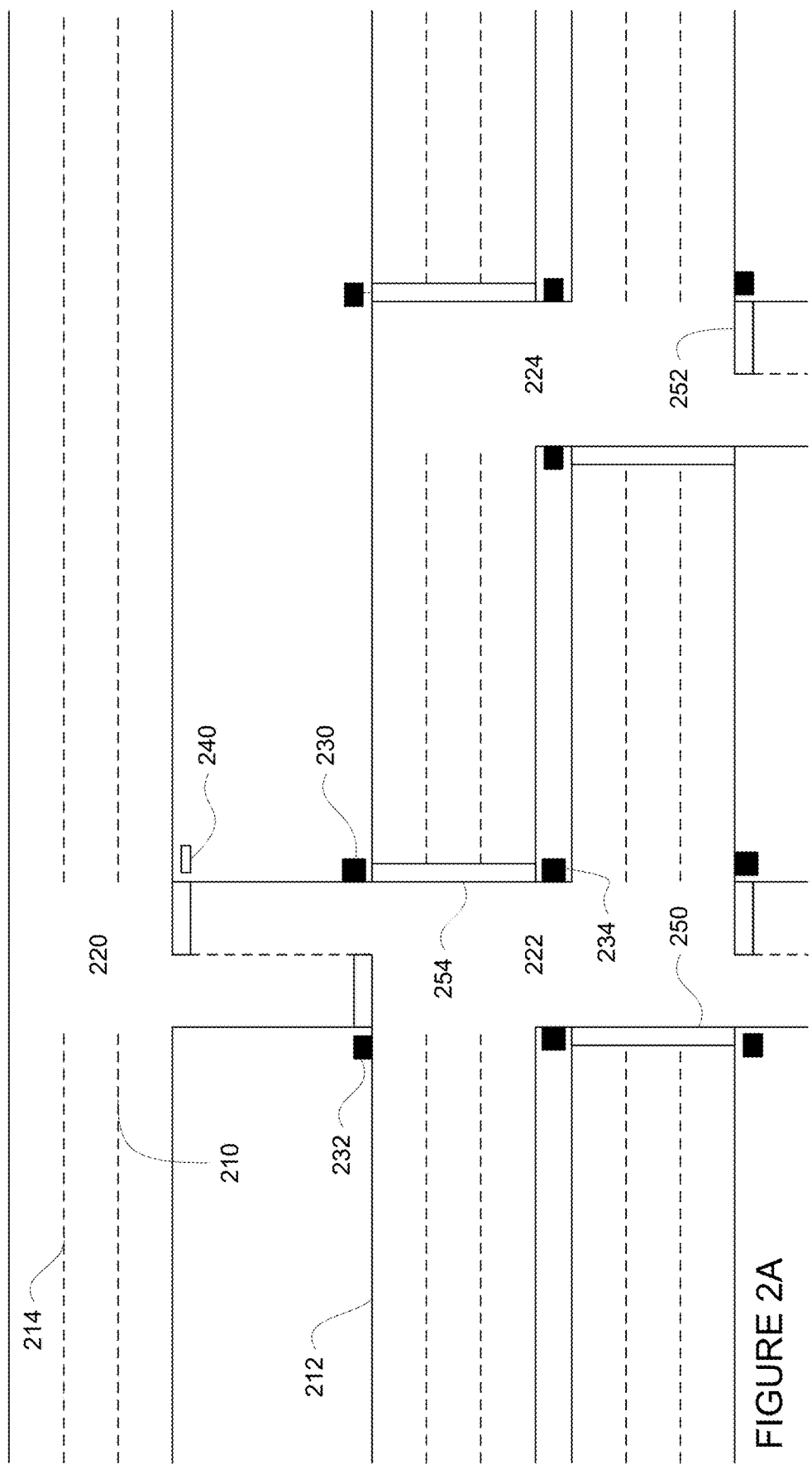
FIGS. 2A and 2B are diagrams of map information in accordance with aspects of the disclosure.
Figure 2B:
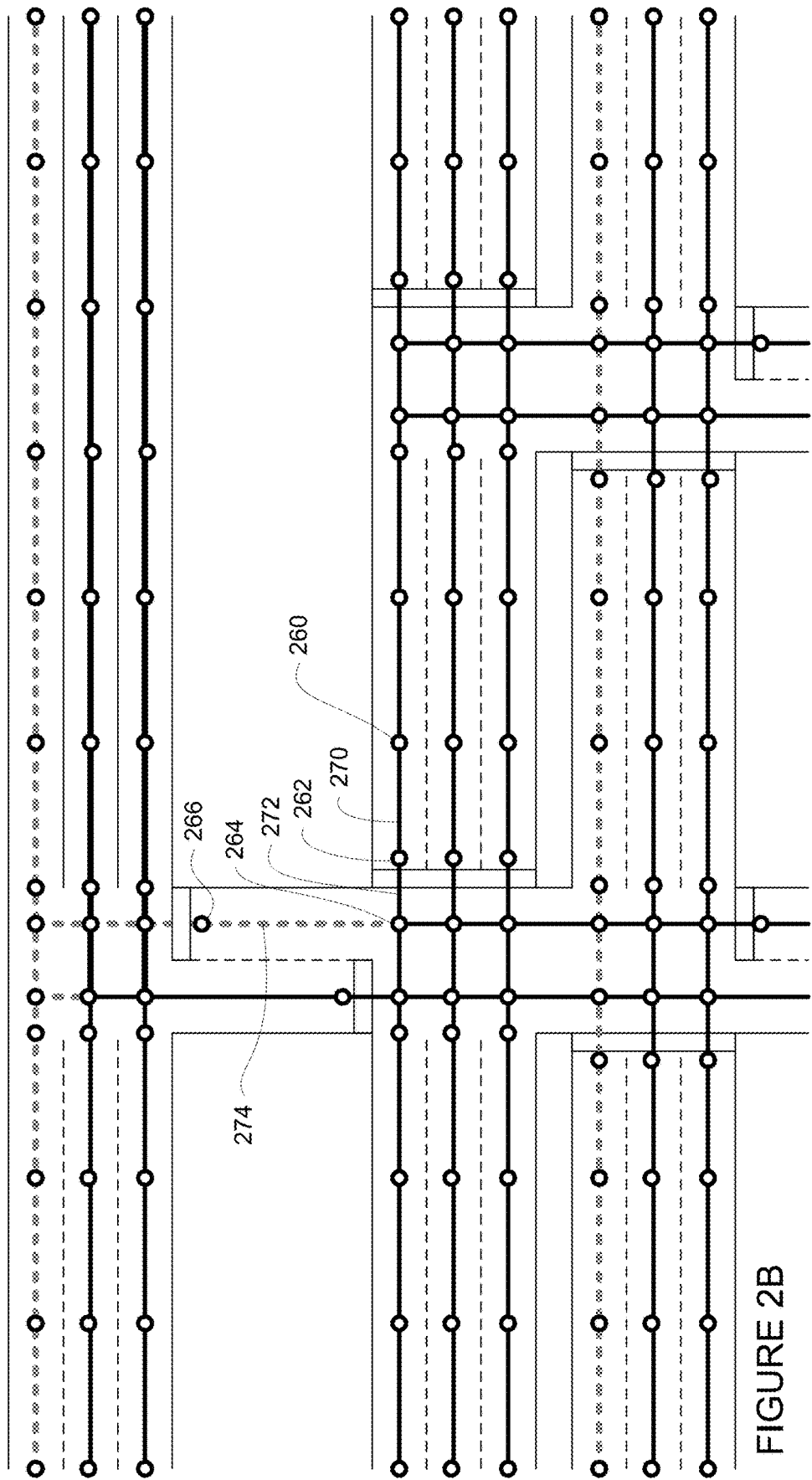
Figure 3A:
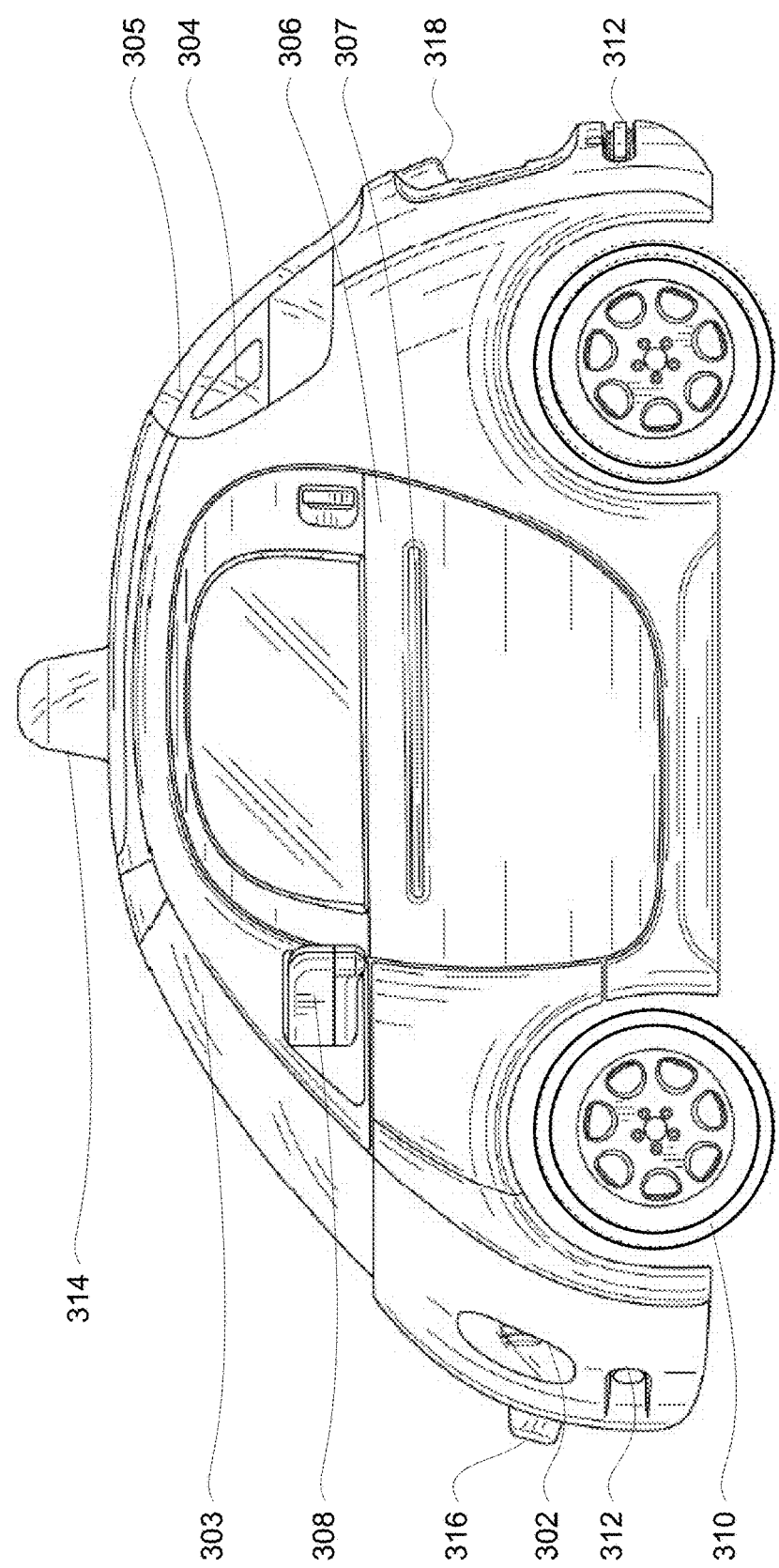
FIGS. 3A-3D are example external views of a vehicle in accordance with aspects of the disclosure.
Figure 3C:
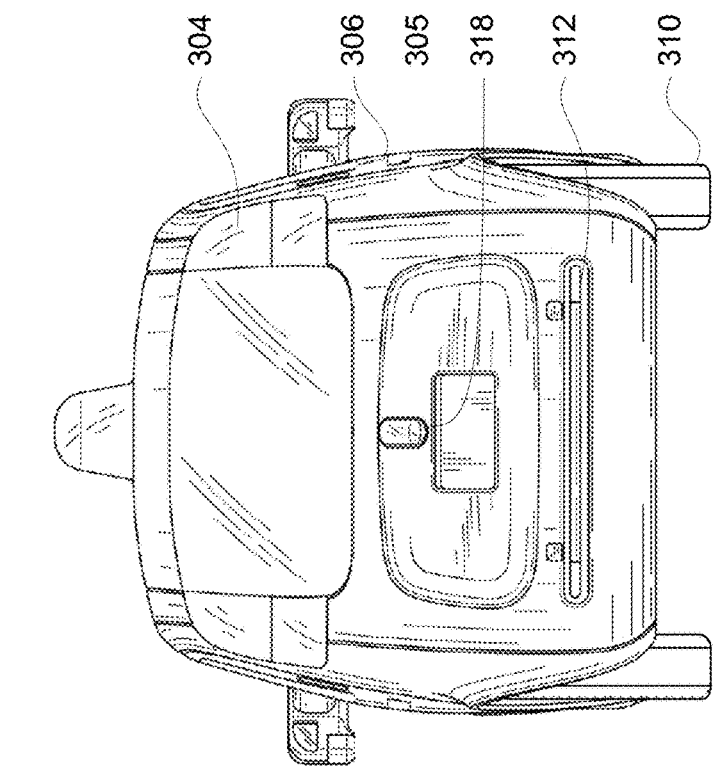
Figure 3B:
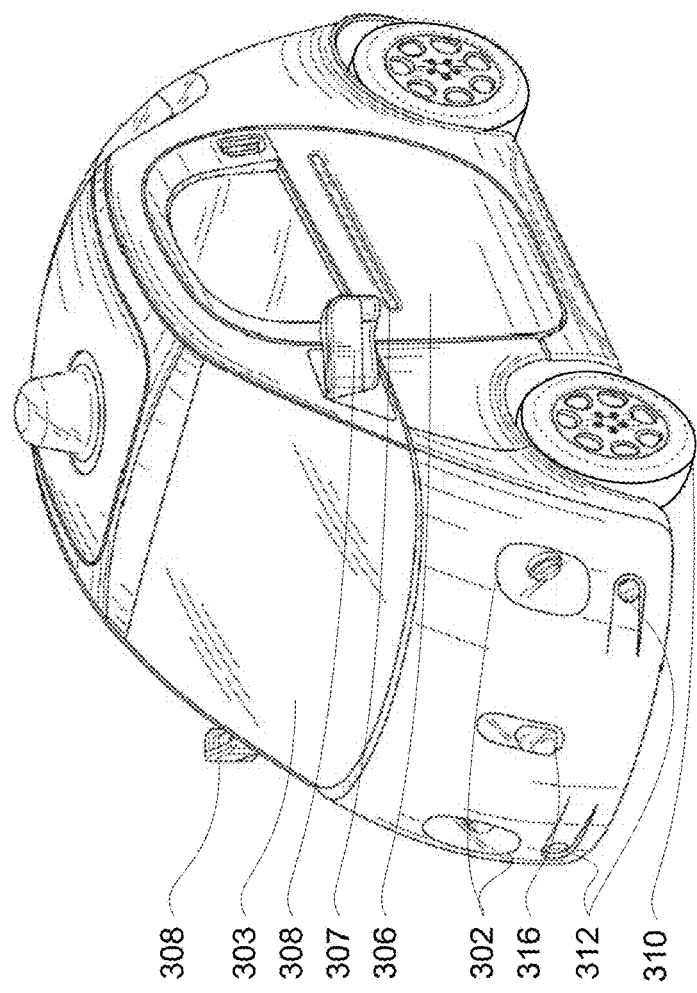
Figure 3D:
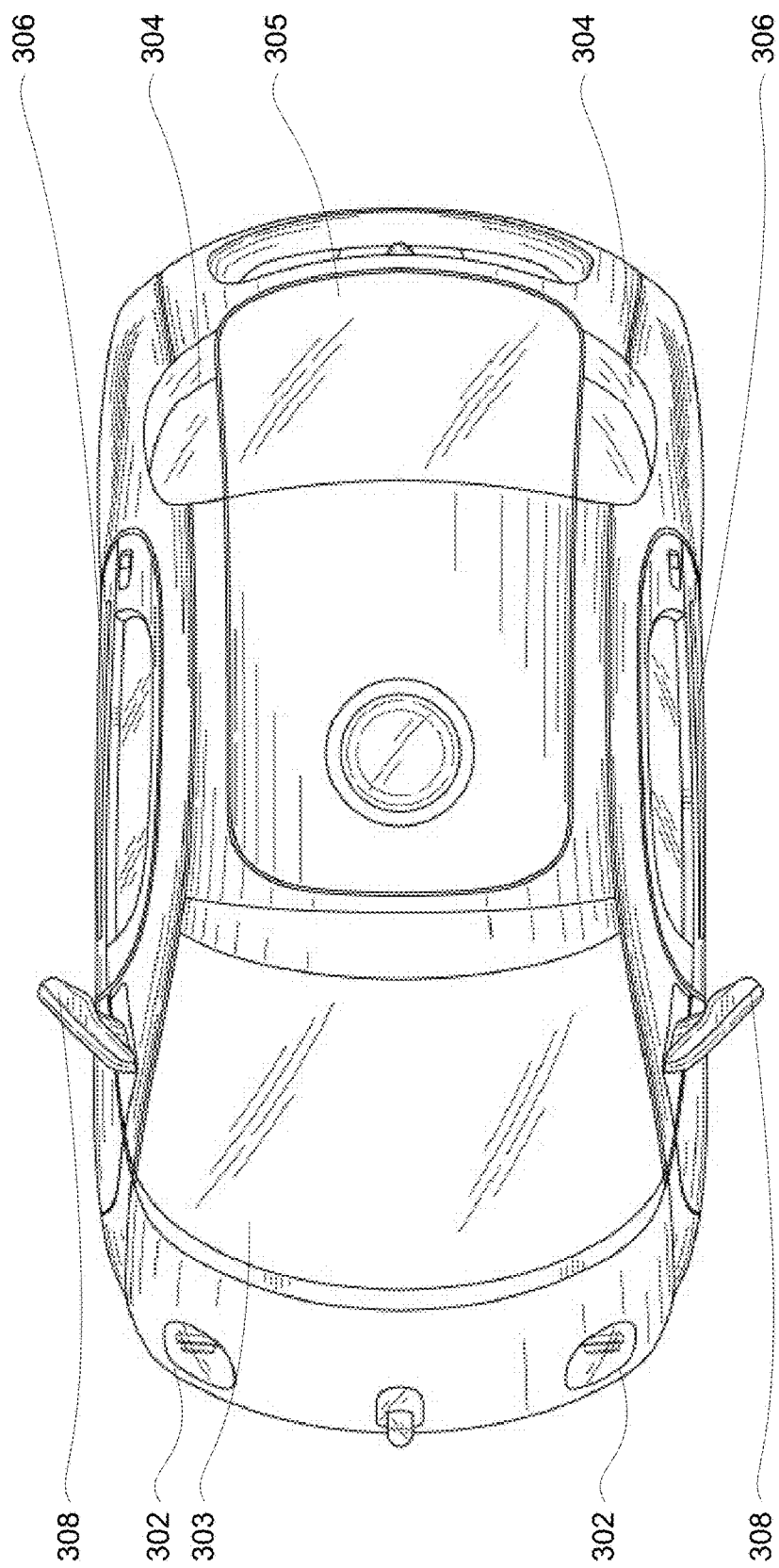

FIGS. 2A and 2B is an example of map information for a section of roadway including intersections 220, 222, 224. FIG. 2A depicts a portion of the map information that includes information identifying the shape, location, and other characteristics of lane marks or lane lines 210, 212, 214, traffic signals 230, 232, 234 (not depicted in the other figures for clarity and simplicity), stop sign 240 (not depicted in the other figures for clarity and simplicity), as well as stop lines 250, 252, 254. In addition to these features, the map information may also include information that identifies lanes defined by the lane lines as well as the direction of traffic for each lane as well as information that allows the computing devices 110 to determine whether the vehicle has the right of way to complete a particular maneuver (i.e. complete a turn or cross a lane of traffic or intersection).

In addition to the feature information, the map information may include a series of road or lane segments. Each lane segment is defined by a starting point, an ending point, and an identifier. For instance, FIG. 2B depicts most of the information of FIG. 2A with the addition of a plurality of lane segments, including for example, lane segments 270, 272, 274. Of course, though many lane segments are depicted, only a few are referenced for clarity and simplicity. FIG. 2B depicts these starting and ending points as open circles, such as open circles 260, 262, 264, 266. Of course, though many open circles are depicted, each representing a starting and ending point, only a few are referenced for clarity and simplicity. As can be seen, circle 260 represents a starting point for lane segment 270, and circle 262 represents an ending point for segment 270. Similarly, circle 262 represents a starting point for lane segment 272, and circle 264 represents an ending point for lane segment 272. In addition, circle 264 represents a starting point for lane segment 274, and circle 266 represents an ending point for lane segment 274. Although not shown, each of these lane segments may be associated with an identifier, for instance, a numeric value corresponding to a relative or actual location of the lane segment.

The map information may also identify additional information about the segments. For example, as shown in FIG. 2B, lane segments 270 and 272 are shown in solid line, indicating that lane segments 270 and 272 are available for the vehicle to drive autonomously. At the same time, lane segment 274 is shown in dashed line to indicate that lane segment corresponds to a no-go region where the vehicle is not able to travel. This may include, for instance, areas of known construction, congested areas, lanes that lead to entrance ramps for highways (for instance, where the vehicle is not permitted to drive on the highway or at such high speeds), lanes that lead to areas that are not sufficiently mapped (i.e. not sufficiently described in the map information), or other reasons etc. Of course, though many solid lane segments (available for the vehicle to drive autonomously) and dashed lane segments (no-go regions) are depicted, only a few are referenced for clarity and simplicity.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated with the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system 172 may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing devices 110.

Data 134 may store various behavior-time models for predicting an object's future behavior for a pre-determined period of time, such as the next 10 seconds or more or less. In one example, the behavior-time models may be configured to use data for an object received from the perception system 172, and in particular another road user, including the road user's characteristics as well as additional contextual information discussed in further detail below. As an example, given the location, heading, speed, and other characteristics included in the data from the perception system 172, the behavior-time models may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur.

Thus, the behavior-time models may be configured to generate a set of possible hypotheses for what a particular road user will do over a particular horizon or predetermined period of time (e.g. 10 seconds) and relative likelihoods for each hypothesis. These models may be trained using data about how an object observed at that location behaved in the past, intuition, etc., and may also be specifically designated for particular types of objects, such as vehicles, pedestrians, motorcycles, bicyclists, etc. The computing devices 110 can then reason about hypotheses that interact with the vehicle's trajectory and are of a sufficient likelihood to be worth considering.

The computing devices 110 may control the direction and speed of the vehicle by controlling various components. By way of example, computing devices 110 may navigate the vehicle to a destination location completely autonomously using data from the detailed map information, perception system 172, and routing system 168. In order to maneuver the vehicle, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
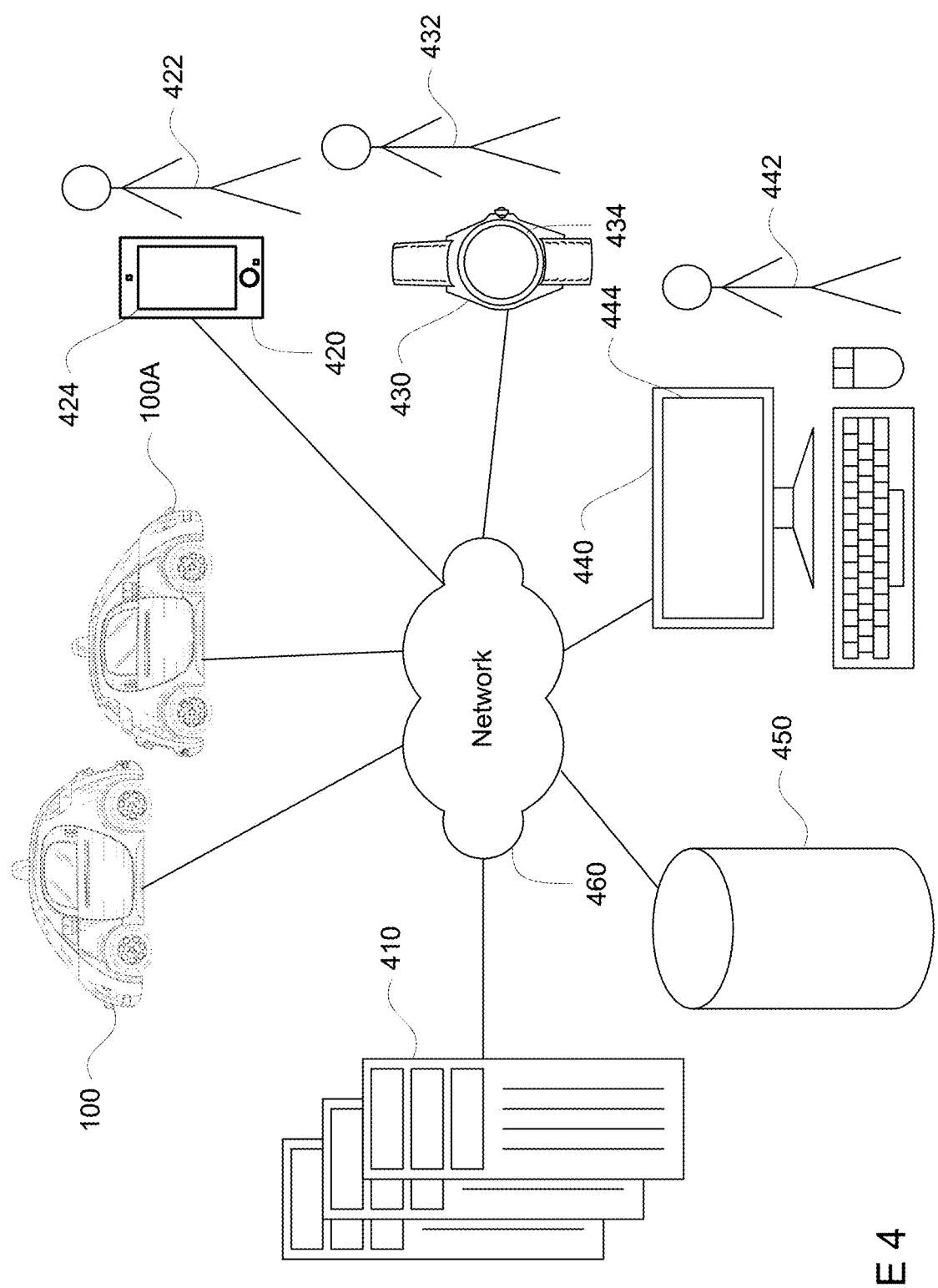
FIG. 4 is a pictorial diagram of a system in accordance with aspects of the disclosure.
Figure 5:
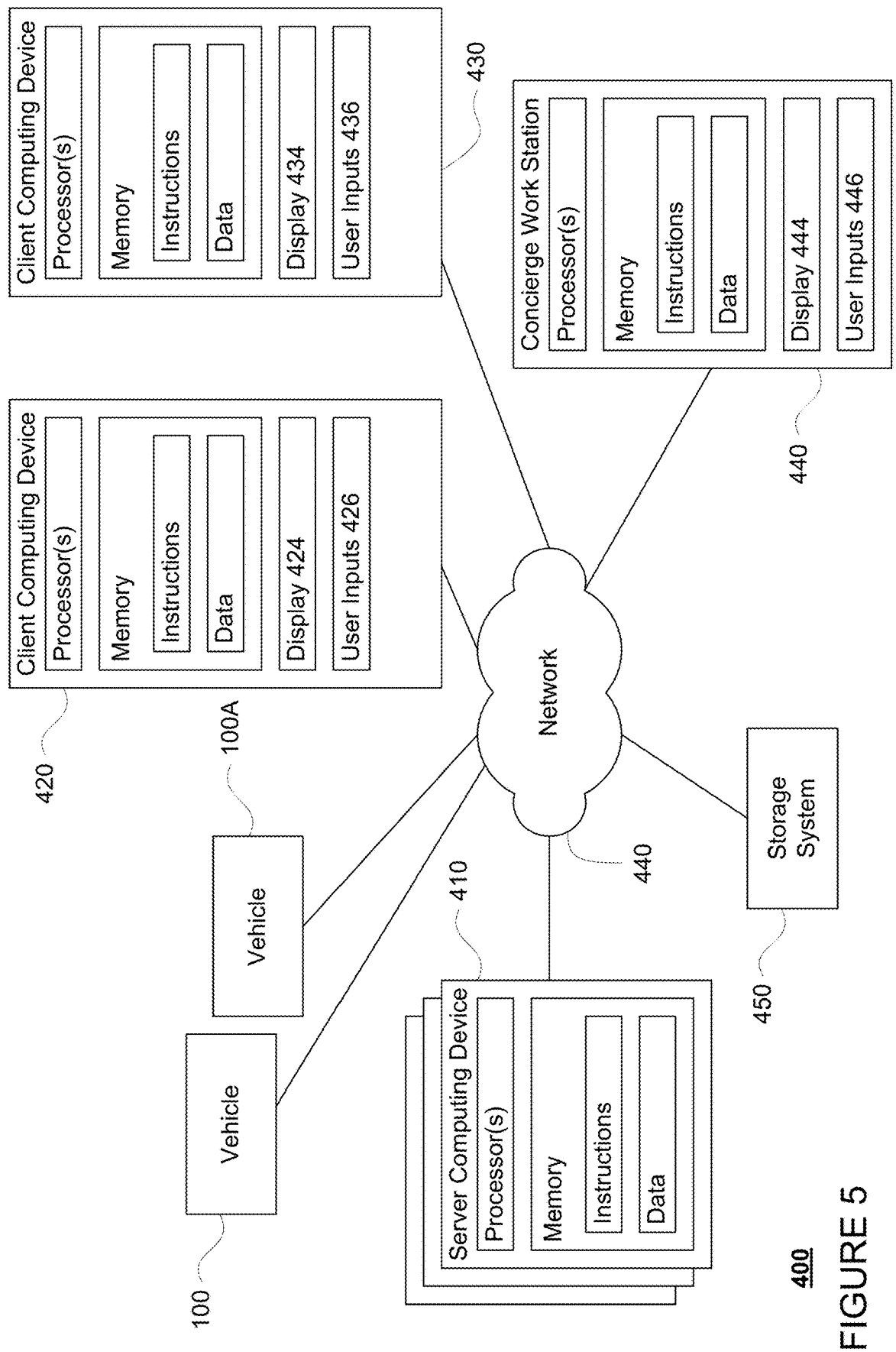
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be a concierge work station used by an administrator to provide concierge services to users such as users 422 and 432. For example, user 442 may be a concierge that uses concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computing devices 110 may initiate the necessary systems to control the vehicle autonomously along a route to the destination location. For instance, the navigation system 168 may use the map information of data 134 to determine a path or route to the destination location that follows a set of the lane segments of map information. The computing devices 110 may then maneuver the vehicle autonomously (or in an autonomous driving mode) as described above along the route towards the destination.

Figure 6:
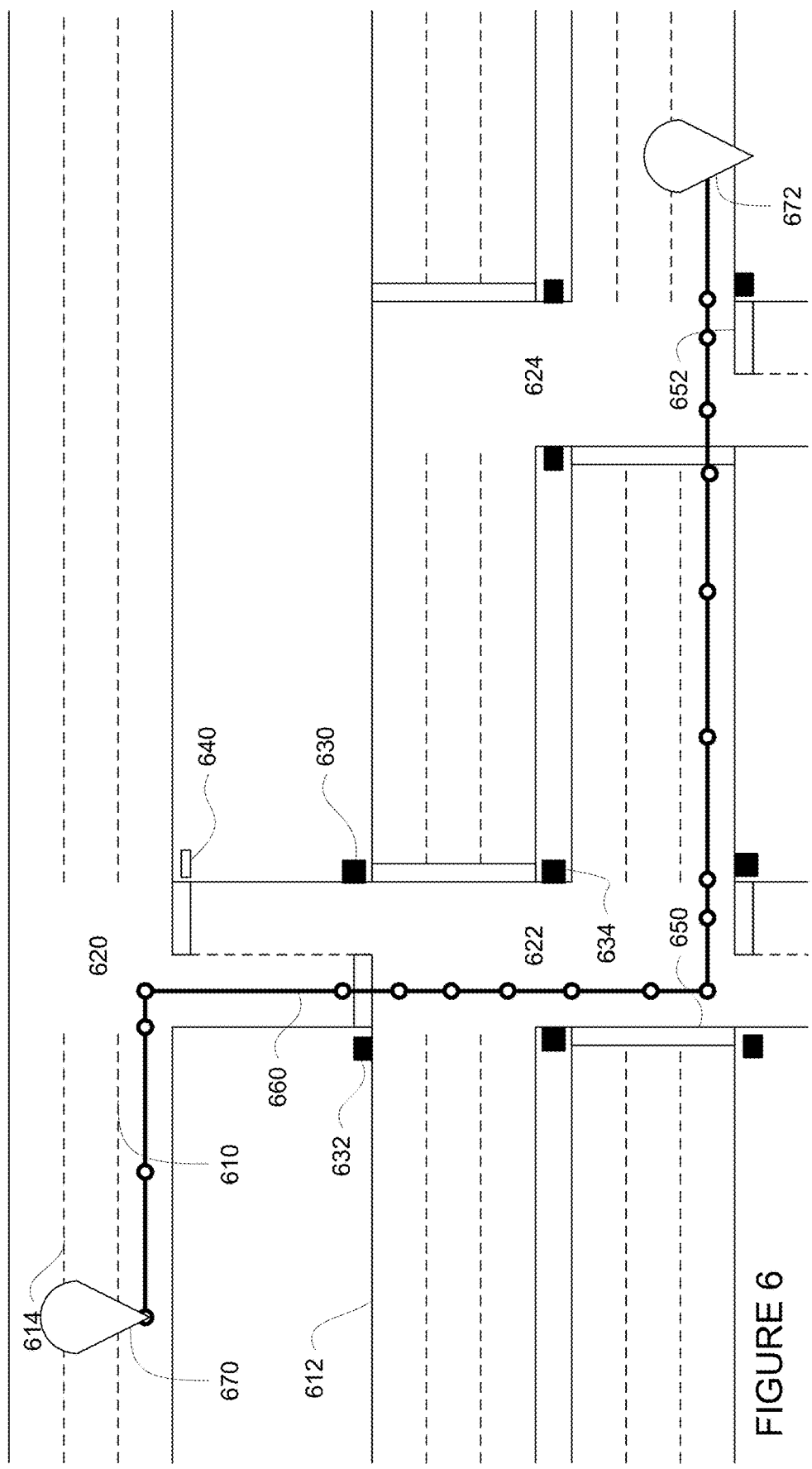
FIGS. 6-14 are views of a section of roadway and data in accordance with aspects of the disclosure.

FIG. 6 is an example view of a section of roadway corresponding to the section of roadway defined in the map information of FIGS. 2A and 2B. For instance, FIG. 6 depicts intersections 620, 622, 624 that correspond to intersections 220, 222, 224. In addition the shape, location, and other characteristics of lane lines 610, 612, and 614 correspond to the shape, location and other characteristics of lane lines 210, 212, 214. Similarly, traffic signals 630, 632, 634 (not depicted in the other figures for clarity and simplicity) correspond to traffic signals 230, 232, 234, stop sign 640 (not depicted in the other figures for clarity and simplicity)

corresponds to stop sign 240, and stop lines 650, 652, 654 correspond to stop lines 250, 252, 254.

By connecting lane segments together, the routing system 168 may generate a route between two locations. For instance, FIG. 6 depicts a route 660 between a marker 670 representing a starting location (i.e. a starting location of the vehicle 100) and a marker 672 representing a destination location. As can be seen, route 660 includes a plurality of lane segments of the map information of FIG. 2B strung together between the starting location and the destination location. Of course, such routes do not include any lane segments identified as no-go regions in the map information.

Figure 7:
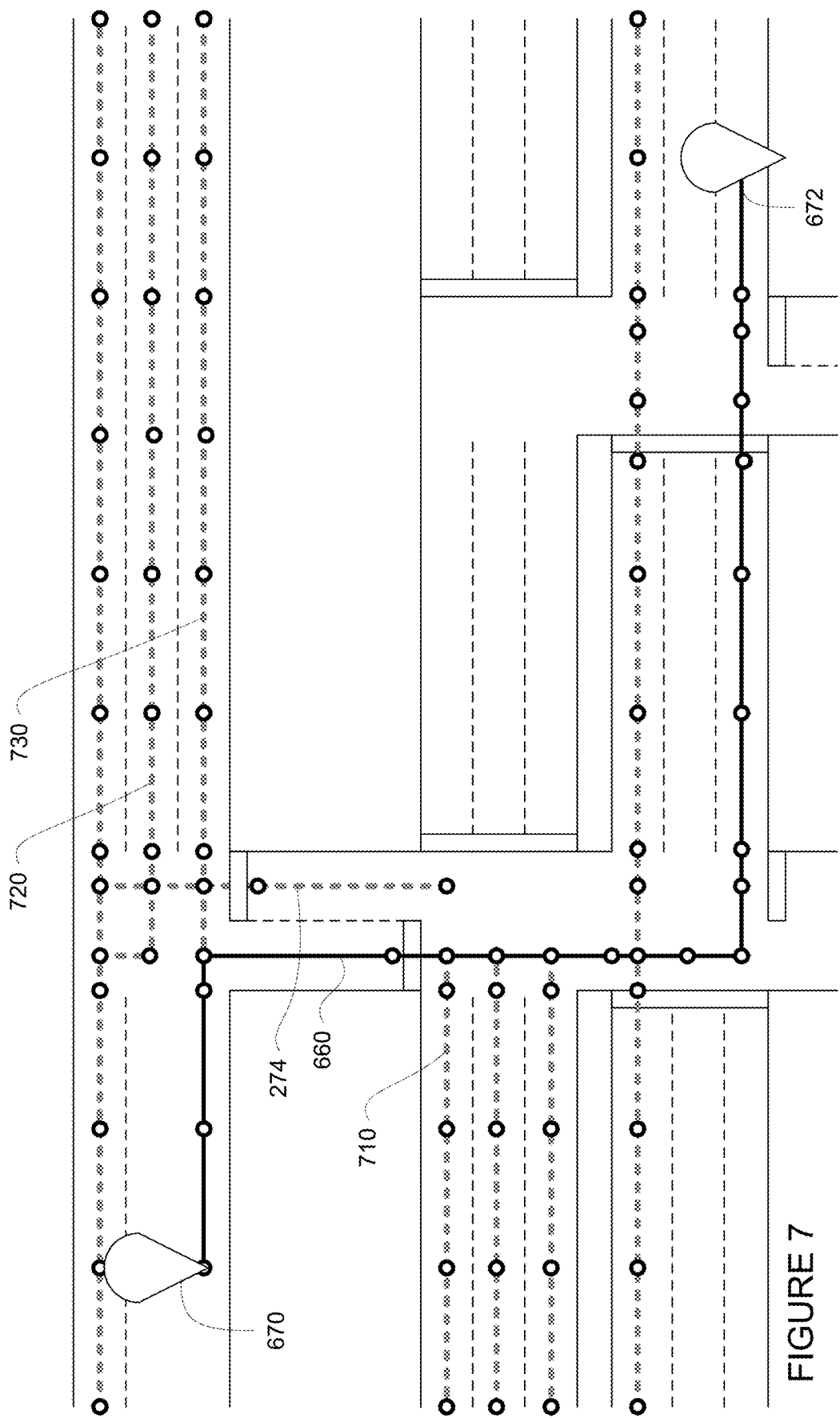

Once a route is identified, all relevant no-go regions for the destination location may be identified. A simple graph walk may be used starting from the destination towards the starting location. Essentially, this assumes that the destination remains constant and identifies all segments which would not get the vehicle to the destination. For example, assuming the destination represented by marker 672 remains constant, FIG. 7 depicts all of the no-go regions (the lane segments depicted in dashed line) from the map information of FIG. 2B that are within the regions through which the route 660 passes, including lane segment 274. In addition, FIG. 7 depicts additional no-go regions corresponding to the line segments 710, 720, 730 (shown in dashed line) which, while not included in the detailed map information as no-go regions, correspond to lane segments which would not get the vehicle to the destination location of marker 671. No other detailed analysis is required at this point, and thus, this determination may be done only once per a destination.

Figure 8:
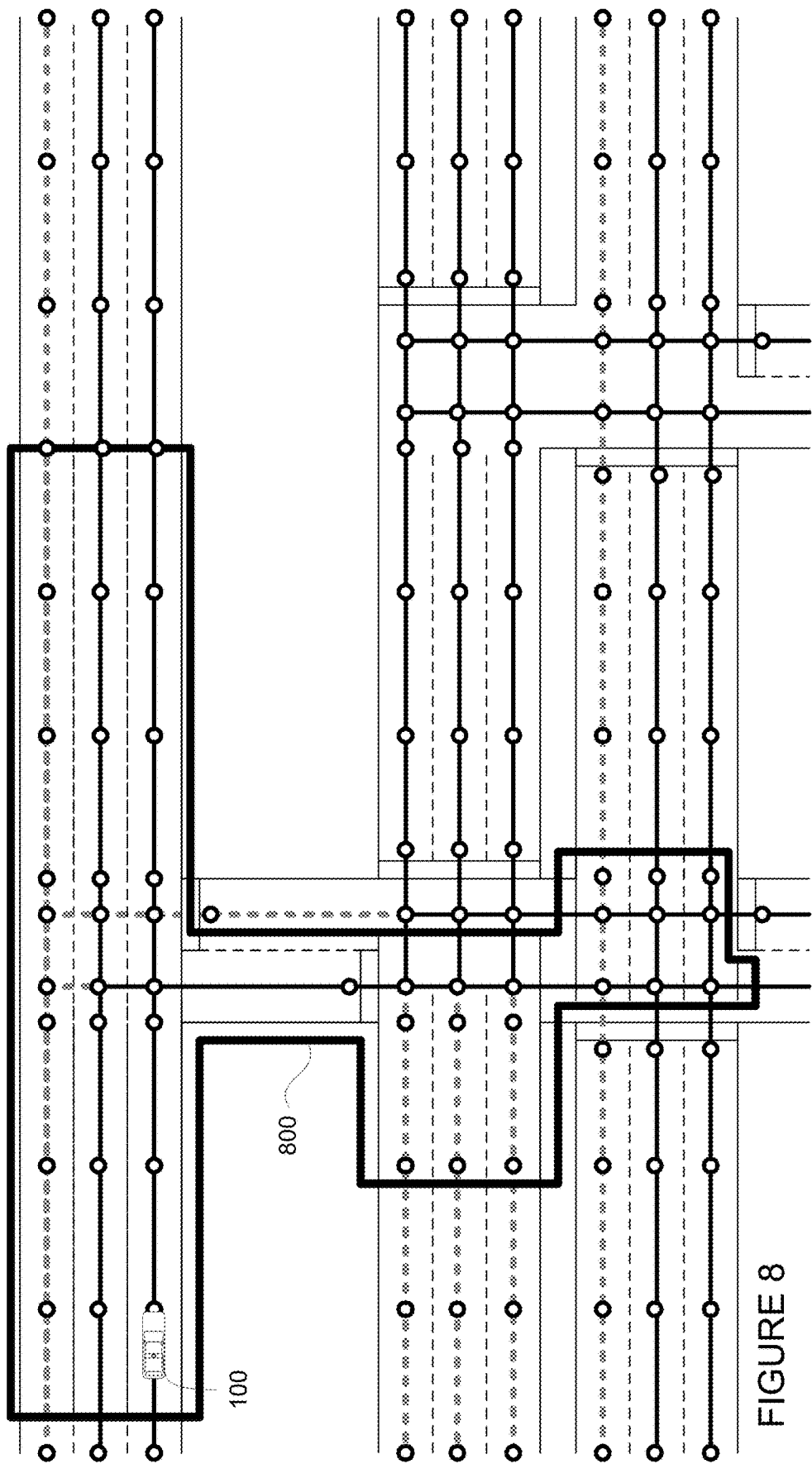

Using the current location of the vehicle, a local region may be identified. This local region may include some small region behind the vehicle as well as the area in front (in the direction of travel) and around (in the lateral directions from) the vehicle. For instance, the local region may correspond to all areas that the vehicle could possibly reach within some predetermined period of time, such as the next 45 seconds or more or less, as well as the last 10 seconds or more or less where the vehicle just was. FIG. 8 depicts vehicle 100 at the starting location of marker 670 (not shown) with the map information of FIGS. 2A and 2B. Local region 800 represents an area covering the lane segments that the vehicle 100 could reach within the predetermined period of time. This local region may be identified periodically, for instance every 2-3 seconds or more or less.

Figure 9:
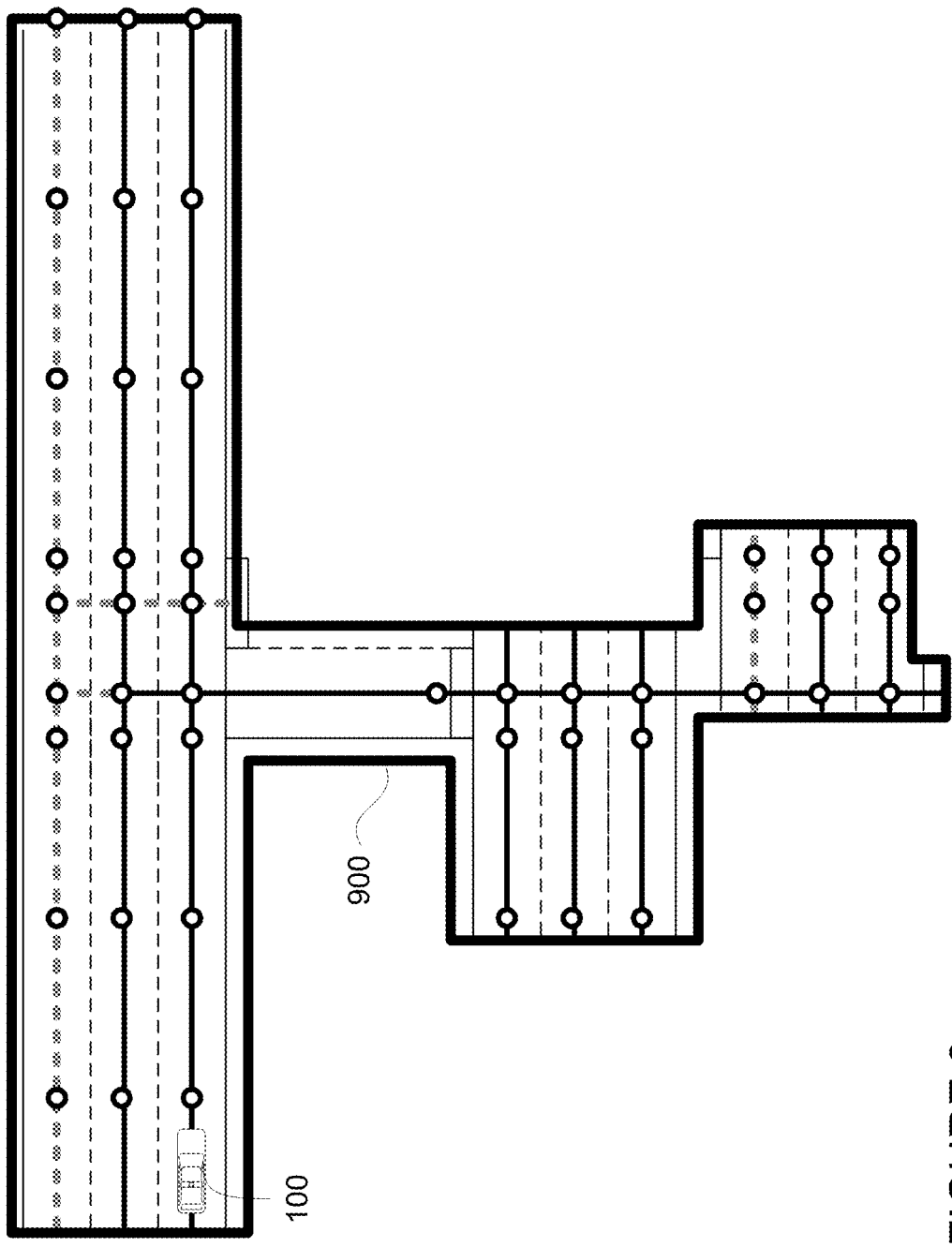

The local region is then used to perform a simple graph cut, in other words, defining a periphery using the local region to separate a map region from the rest of the map information. For example, a graph cut of the local region 800 would result in the map region 900 as shown in FIG. 9. This identifies all of the lane segments within the map region. Alternatively, segments of the map information may be identified by doing a simple graph walk within the area of the region.

Figure 10:
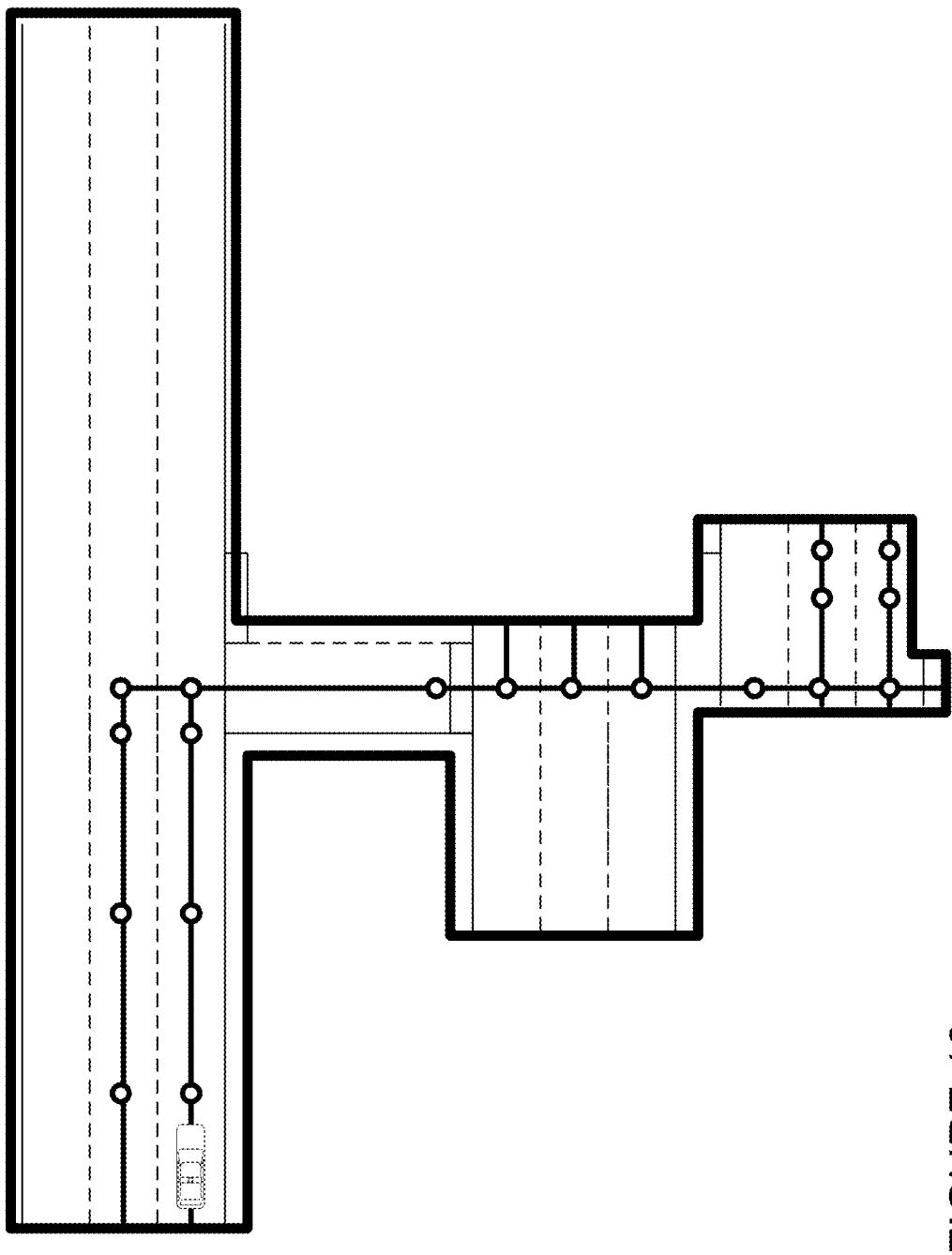

Any previously identified no-go regions (from the map information as well as any additional no-go regions identified based on the destination location) are then removed from the map region to provide obtain a filtered map region. For example, filtering the previously identified no-go regions (lane segments shown in dashed line) depicted in FIG. 7 from the map region 900 would result in the filtered map region 1000 of FIG. 10.

All remaining lane segments in filtered map region are then assigned a cost value. Costs may be assigned based on a priori knowledge of the vehicle's environment. For instance, costs may be assigned to each lane segment based on whether the lane segment requires the vehicle 100 to merge into a new lane, whether the lane segment requires another vehicle has to merge into a new lane, whether the lane segment is a rightmost lane in a busy commercial area (i.e. with heavy street parking, vehicles moving or backing out of spots, pedestrian traffic), whether the lane segment is a rightmost lane with an active driveway or driveways (i.e. are other vehicles attempting to leave the driveway or driveways), whether the lane segment corresponds to a narrow road, whether the lane segment corresponds to a road that has been narrowed by habitually having lots of vehicles parked on one or both sides, whether the lane segment would require the vehicle to make a particular type of turn (i.e a protected left turn, a left turn at a four-way stop, a left turn at an uncontrolled intersection, an unprotected left turn, etc.), whether the lane segment corresponds to a road having a particular classification (i.e. freeway, expressway, arterial, boulevard, suburban, urban, residential, parking lot, etc.), whether the lane segment corresponds to a construction area, the amount of time to reach the destination from the lane segment, etc. Because there will be significant overlap between regions for many of the cost values, this information may be stored in local cache for quick retrieval.

The cost values may then be provided to the planner system in order to determine how to maneuver the vehicle. For example, the vehicle's computing devices may determine the lowest cost set of segments that lead out of local region. With regard to the amount of time to reach the destination, the computing devices may attempt to minimize the cost to get from the vehicle's current or future location to a edge of the local region. In addition, the computing devices may also consider the cost of going from the various lane segments at the edges of the local region to the destination, and use this as a factor when identifying which paths within the local region should be used. For instance, if there are two exits from a local region; one of which is 2 minutes from the destination and the other of which is 20 minutes from the destination, the 18 minute difference may be used to inform the computing devices which paths within the local region are preferred (have lower costs) over others. The result may be used to plan how to control the vehicle for a brief period into the future, for instance, the next 10 seconds or more or less.

Because the planner system will determine a new plan several times per second, many of the cost values may simply be stored and retrieved from the local cache within the vehicle's computing devices. Those that are likely to change when the vehicle moves within local region (such as those relating to the time to destination, etc.) may be recalculated as needed. In addition, all or less than all of the cost values may be recalculated when a new local region local region is calculated.

Figure 11:
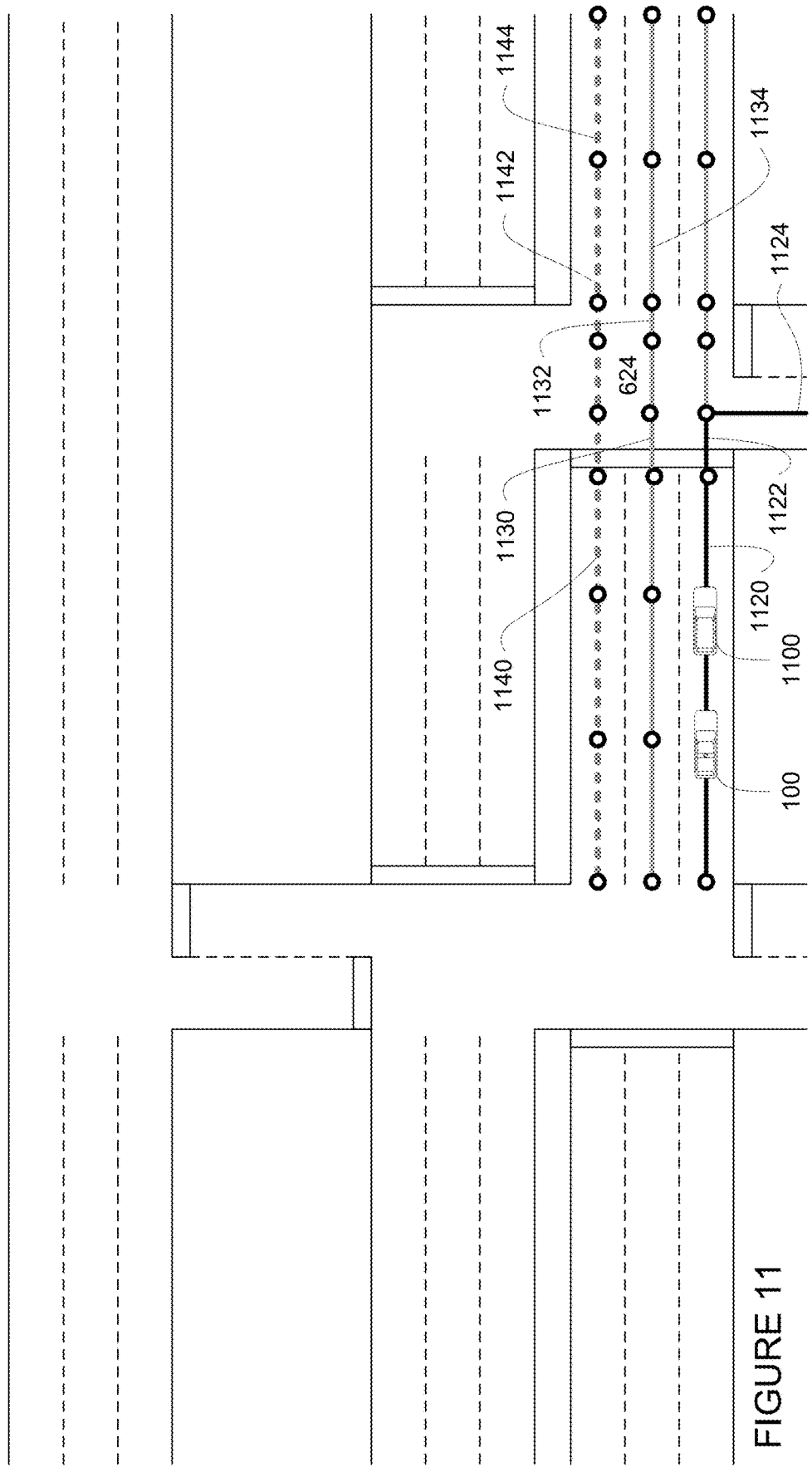

By using the cost values as described above, the vehicle's computing devices may make better informed decisions about whether to weave around or pass a slow moving or stopped object. FIGS. 11-14 provide examples of such scenarios. FIG. 11 is an example of weaving around a slow moving or stopped vehicle where continuing straight would be less optimal than turning, but still an option. In this example, vehicle 100 is moving towards intersection 624. Vehicle 1100 is also approaching intersection 624 and is in the same lane as vehicle 100. As noted above, vehicle 1100 may be a slow moving or stopped vehicle.

A subset of the lane segments of FIG. 2B are depicted in solid black, solid gray, or dashed lines. The solid black lane segments (such as line segments 1120, 1122, 1124) represent lane segments having lower cost values. In this regard, these solid black lane segments may actually correspond to the route that the vehicle is following to a destination (not shown) which includes the vehicle making a right turn at intersection 624. The solid gray lane segments (such as lane segments 1130, 1132, 1134) represent lane segments having higher cost values than the solid black line segments. The dashed line lane segments (such as lane segments 1140, 1142, 1144) represent lane segments associated with no-go regions (as is shown in FIG. 2B) or that simply have higher cost values than the solid gray lane segments. Of course, only a subset of the lane segments of FIG. 2B are depicted for clarity and simplicity. In this example, the computing devices are able to control the vehicle 100 to maneuver around vehicle 1100 and through the intersection 624 without actually making a right turn at the intersection. Of course, the computing devices 110 would likely not use the dashed line lane segments given the high cost values.

Figure 12:
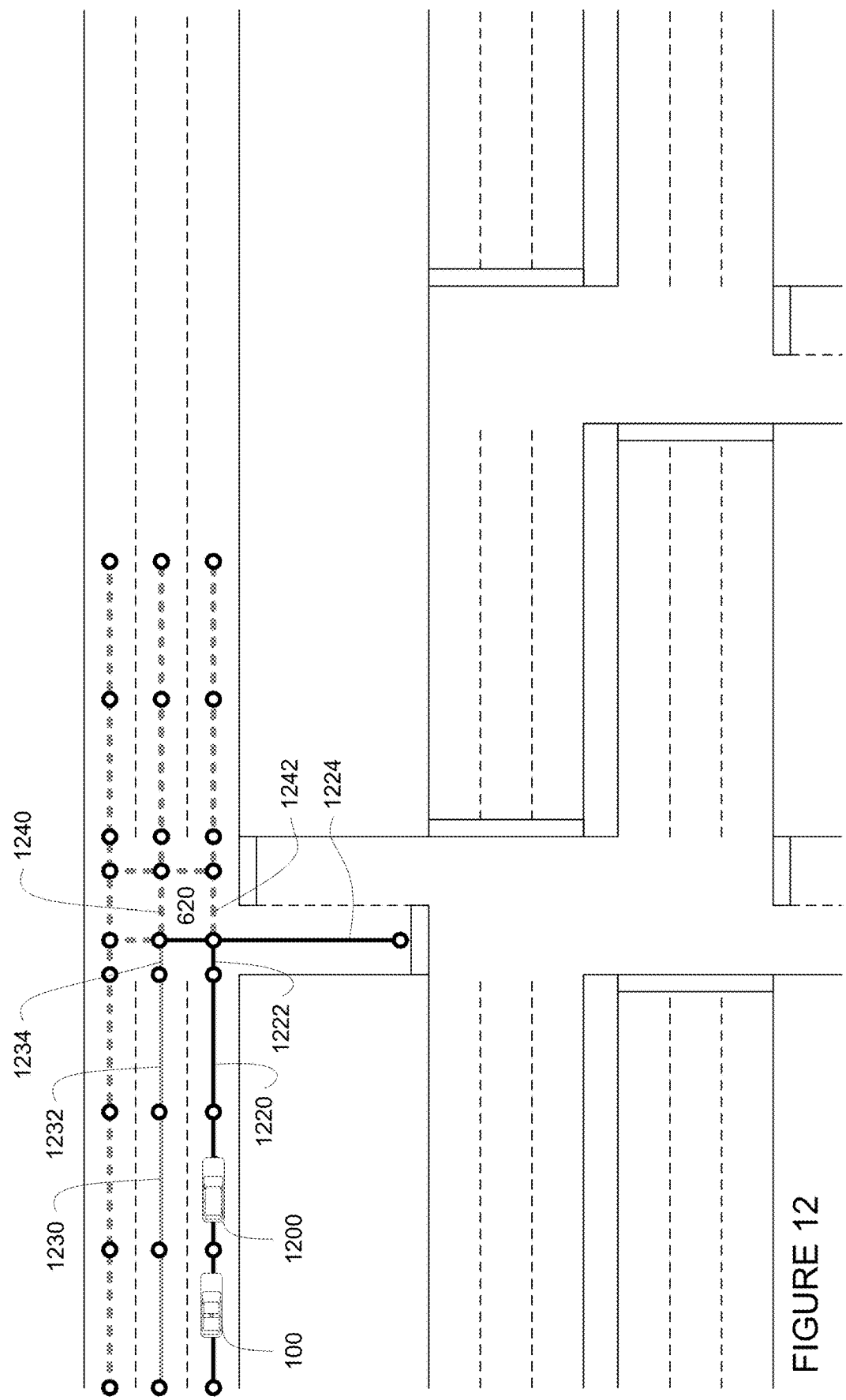
Figure 13:
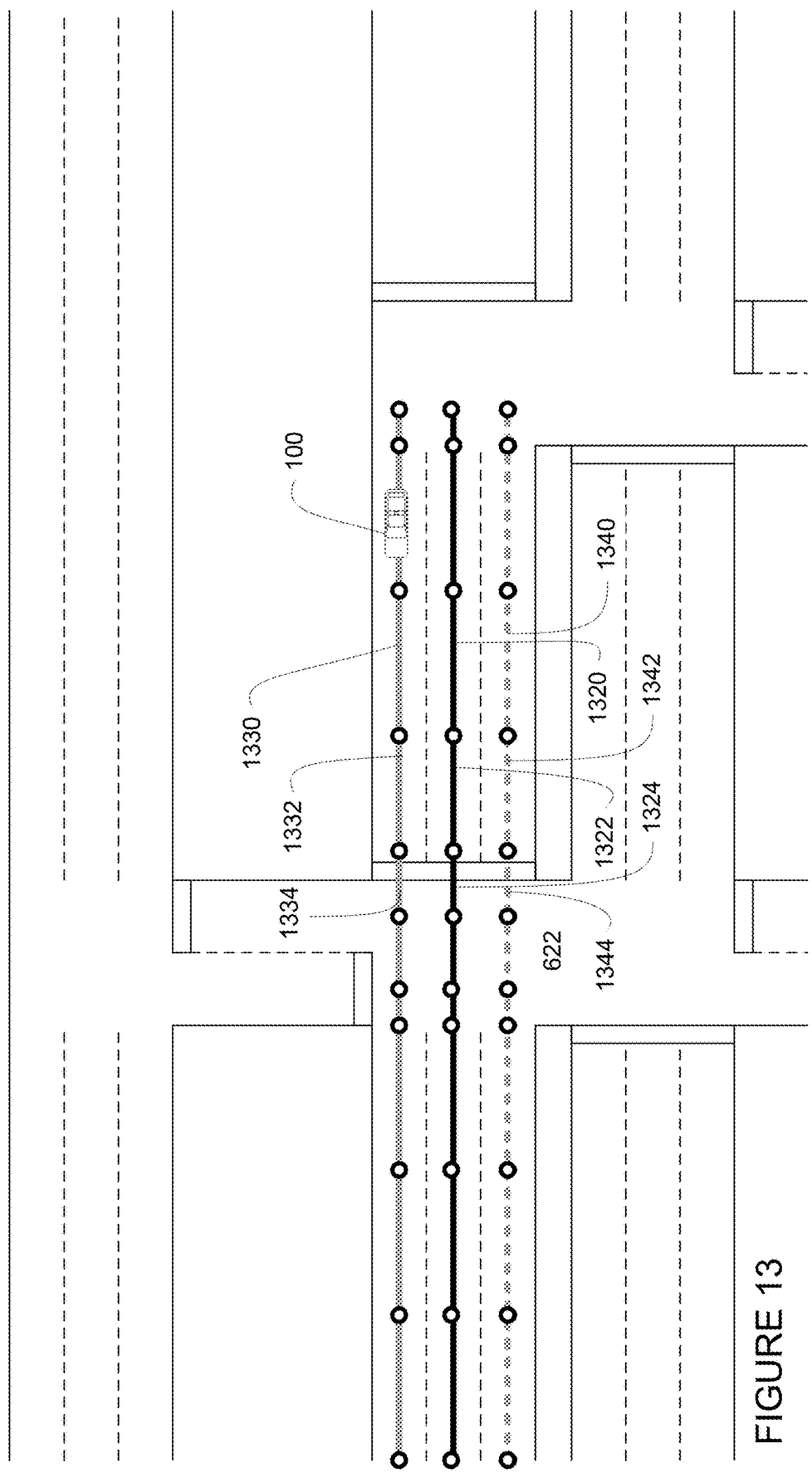

FIG. 12 is an example of weaving around a slow moving or stopped vehicle where continuing straight is not an option. In this example, vehicle 100 is moving towards intersection 624. Vehicle 1200 is also approaching intersection 624 and is in the same lane as vehicle 100. As noted above, vehicle 1200 may be a slow moving or stopped vehicle.

A subset of the lane segments of FIG. 2B are depicted in solid black, solid gray, or dashed lines. The solid black lane segments (such as line segments 1220, 1222, 1224) represent lane segments having lower cost values. In this regard, these solid black lane segments may actually correspond to the route that the vehicle is following to a destination (not shown) which includes the vehicle making a right turn at intersection 620. The solid gray lane segments (such as lane segments 1230, 1232, 1234) represent lane segments having higher cost values than the solid black line segments. The dashed line lane segments (such as lane segments 1240, 1242) represent lane segments associated with no-go regions (as is shown in FIG. 2B) or that simply have higher cost values than the solid gray lane segments. Of course, only a subset of the lane segments of FIG. 2B are depicted for clarity and simplicity. In this example, the computing devices are able to control the vehicle 100 to maneuver around vehicle 1200 but not through the intersection 620. Here, because they represent no-go regions (or alternatively, very high cost values) the computing devices would not use line segments 1240 and 1242. Thus, the vehicle 100 would be prevented from continuing through the intersection 620 without making a right turn.

Similarly, the computing devices 110 are able to made decisions about whether to drive in a particular lane. For instance, on busy roads it may be necessary to try to avoid driving in the right lane, while avoiding the left lane may also be important for safety reasons such as in the example of FIG. 13. In this example, vehicle 100 is moving towards intersection 622. A subset of the lane segments of FIG. 2B are depicted in solid black, solid gray, or dashed lines. The solid black lane segments (such as line segments 1320, 1322, 1324) represent lane segments having lower cost values. In this regard, these solid black lane segments may actually correspond to the route that the vehicle is following to a destination (not shown) which includes the vehicle moving through intersection 622. The solid gray lane segments (such as lane segments 1330, 1332, 1334) represent lane segments having higher cost values than the solid black line segments. The dashed line lane segments (such as lane segments 1340, 1342, 1344) represent lane segments associated with no-go regions (as is shown in FIG. 2B) or that simply have higher cost values than the solid gray lane segments. Of course, only a subset of the lane segments of FIG. 2B are depicted for clarity and simplicity. In this example, the computing devices are able to control the vehicle 100 to maneuver vehicle on any of lane segments 1320, 1322, 1324, 1330, 1332, and 1334 (the right or middle lanes) with a preference for lane segments 1320, 1322, and 1324 (the middle lane) due to the lower cost values. Here, because they represent no-go regions (or alternatively, very high cost values) the computing devices would not use line segments 1340, 1342 and 1344 (the left lane). Thus, the vehicle 100 would be prevented from driving in the left lane, while being permitted to drive in the middle or right lanes.

Figure 14:
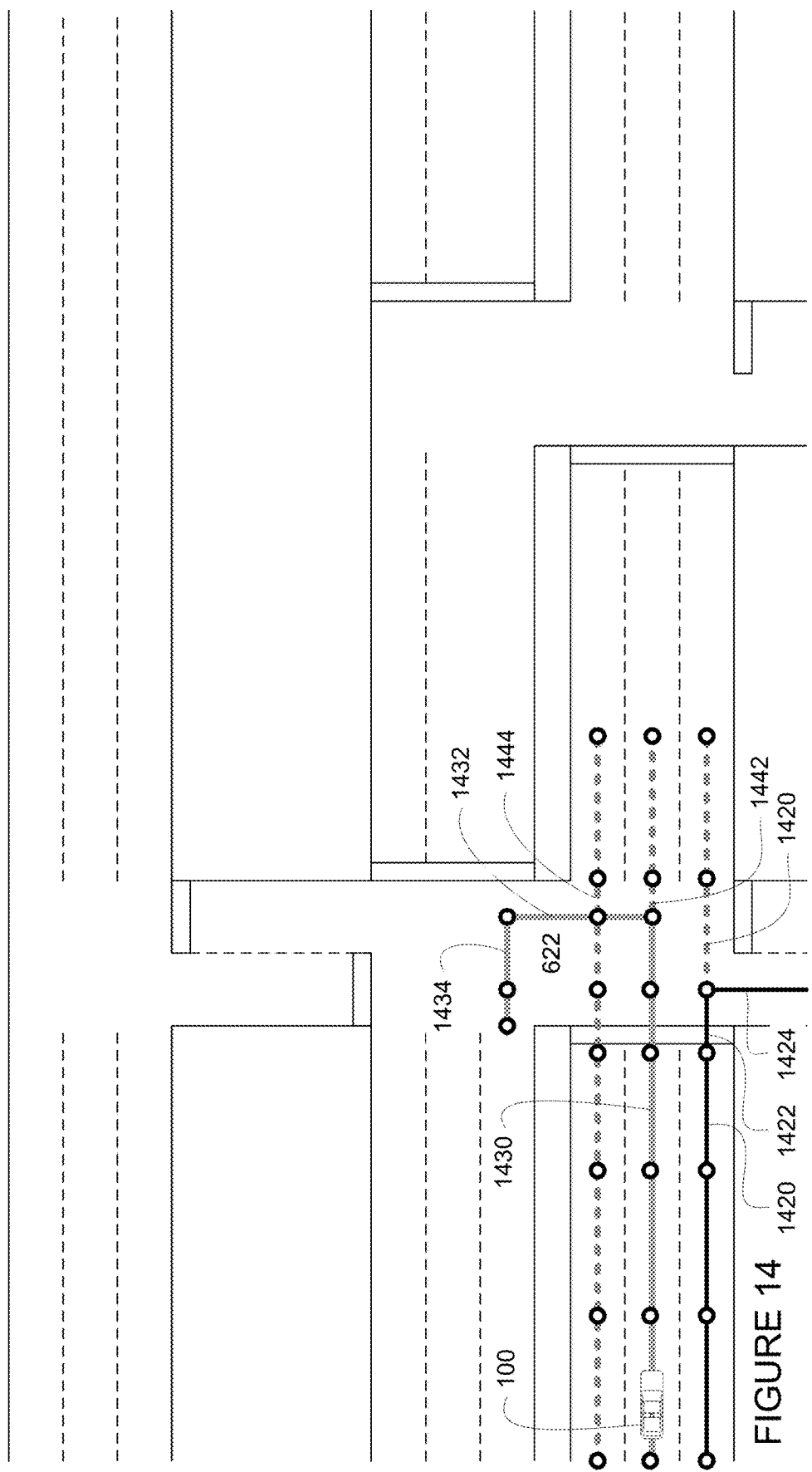

The cost values may also allow the vehicle's computing devices to identify forced lane changes in one direction (as in the example of FIG. 12) or multiple directions. For example, FIG. 14 depicts a forced lane change, but includes two options (a right turn or a left turn/U-turn). In this example, vehicle 100 is moving towards intersection 622. A subset of the lane segments of FIG. 2B are depicted in solid black, solid gray, or dashed lines. The solid black lane segments (such as line segments 1320, 1322, 1324) represent lane segments having lower cost values. In this regard, these solid black lane segments may actually correspond to the route that the vehicle is following to a destination (not shown) which includes the vehicle moving through intersection 622 and making a right turn. The solid gray lane segments (such as lane segments 1330, 1332, 1334) represent lane segments having higher cost values than the solid black line segments and in this example, correspond to the vehicle moving through intersection 622 and making a left turn or U-turn at intersection 622. The dashed line lane segments (such as lane segments 1340, 1342, 1344) represent lane segments associated with no-go regions (as is shown in FIG. 2B) or that simply have higher cost values than the solid gray lane segments. Of course, only a subset of the lane segments of FIG. 2B are depicted for clarity and simplicity. In this example, the computing devices are able to control the vehicle 100 to maneuver vehicle on any of lane segments 1320, 1322, 1324, 1330, 1332, and 1334 (the right or middle lanes) with a preference for lane segments 1320, 1322, and 1324 (the right lane) due to the lower cost values. Here, because they represent no-go regions (or alternatively, very high cost values) the computing devices would not use line segments 1340, 1342 and 1344 (the left lane). Thus, line segments 1340, 1342 and 1344 would prevent the vehicle from proceeding through the intersection in the right middle or left lane. In addition, line segments 1340, 1342 and 1344 would force the computing devices 110 to control the vehicle 100 to make either a right turn (following segments 1322 and 1324) or the left turn/U-turn (following segments 1432 and 1434) at intersection 622.

Figure 15:
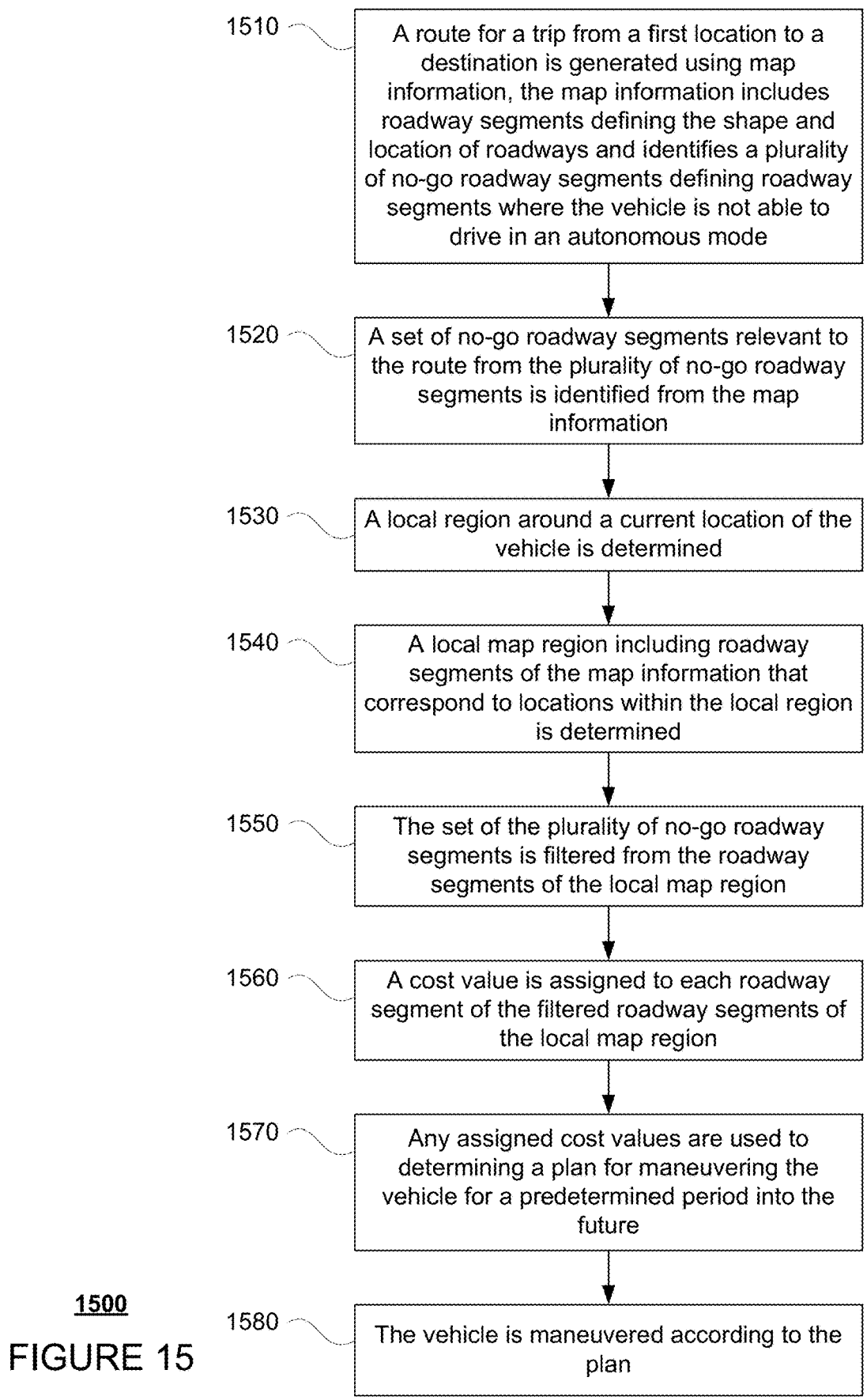
FIG. 15 is a flow diagram in accordance with aspects of the disclosure.

FIG. 15 is an example flow diagram 1500 in accordance which may be performed by one or more processors of one or more computing devices of a vehicle, such as computing devices 110 of vehicle 100 in order to maneuver the vehicle 100 in an autonomous driving mode. In this example, a route for a trip from a first location to a destination is generated using map information at block 1510. The map information includes roadway segments defining the shape and location of roadways and identifies a plurality of no-go roadway segments defining roadway segments where the vehicle is not able to drive in the autonomous mode. A set of no-go roadway segments relevant to the route from the plurality of no-go roadway segments is identified from the map information at block 1520. A local region around a current location of the vehicle is determined at block 1530. A local map region including roadway segments of the map information that correspond to locations within the local region is determined at block 1540. The set of the plurality of no-go roadway segments is filtered from the roadway segments of the local map region at block 1550. A cost value is assigned to each roadway segment of the filtered roadway segments of the local map region at block 1560. Any assigned cost values are used to determining a plan for maneuvering the vehicle for a predetermined period into the future at block 1570. The vehicle is maneuvered according to the plan at block 1580.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for maneuvering a vehicle, the method comprising:
   generating, by one or more processors, a route for a trip from a first location to a destination using map information including a plurality of lane segments;
   determining, by the one or more processors, a set of lane segments for a local map region of the map information based on a current location of the vehicle, wherein the local map region corresponds to all areas that the vehicle could possibly reach within a predetermined period of time;
   assigning, by the one or more processors, a cost value to each lane segment of the set of lane segments of the local map region based on the destination;
   using, by the one or more processors, any assigned cost values to determine whether to pass an object; and
   maneuvering, by the one or more processors, the vehicle based on the determination of whether to pass the object.

2. The method of claim 1, wherein the object is another vehicle in a same lane as the vehicle.

3. The method of claim 1, wherein the object is a stopped vehicle in a same lane as the vehicle.

4. The method of claim 1, wherein determining whether to pass the vehicle is further based on assigned cost values for lane segments for a second lane adjacent to a first lane in which the vehicle is traveling.

5. The method of claim 1, wherein determining whether to pass the object is further based on assigned cost values for lane segments corresponding to the vehicle proceeding through an intersection without a turn if the vehicle passes the object.

6. The method of claim 1, wherein determining whether to pass the object is further based on assigned cost values for lane segments corresponding to the vehicle making a right turn through an intersection if the vehicle does not pass the object.

7. The method of claim 1, wherein at least some of the lane segments of the set of lane segments correspond to lane segments of a lane adjacent to a lane segment in which the vehicle is traveling when the cost values are assigned.

8. The method of claim 1, wherein the cost values are assigned further based on the destination location.

9. The method of claim 1, wherein assigning at least one of the any assigned cost values for a given lane segment of the set of lane segments includes retrieving a previously assigned cost value from local cache.

10. The method of claim 1, wherein assigning at least a second one of the any assigned cost values for a second given lane segment of the set of lane segments includes generating a new value based on the destination.

11. A system for maneuvering a vehicle, the system comprising one or more processors configured to:
    generate a route for a trip from a first location to a destination using map information including a plurality of lane segments;
    determine a set of lane segments for a local map region of the map information based on a current location of the vehicle, wherein the local map region corresponds to all areas that the vehicle could possibly reach within a predetermined period of time;
    assign a cost value to each lane segment of the set of lane segments of the local map region based on the destination;
    use any assigned cost values to determine whether to pass an object; and
    maneuver the vehicle based on the determination of whether to pass the object.

12. The system of claim 11, wherein the object is another vehicle in a same lane as the vehicle.

13. The system of claim 11, wherein the object is a stopped vehicle in a same lane as the vehicle.

14. The system of claim 11, wherein the one or more processors are further configured to determine whether to pass the vehicle is further based on assigned cost values for lane segments for a second lane adjacent to a first lane in which the vehicle is traveling.

15. The system of claim 11, wherein the one or more processors are further configured to determine whether to pass the object is further based on assigned cost values for lane segments corresponding to the vehicle proceeding through an intersection without a turn if the vehicle passes the object.

16. The system of claim 11, wherein the one or more processors are further configured to determine whether to pass the object is further based on assigned cost values for lane segments corresponding to the vehicle making a right turn through an intersection if the vehicle does not pass the object.

17. The system of claim 11, wherein at least some of the lane segments of the set of lane segments correspond to lane segments of a lane adjacent to a lane segment in which the vehicle is traveling when the cost values are assigned.

18. The system of claim 11, wherein the one or more processors are further configured to assign at least one of the any assigned cost values for a given lane segment of the set of lane segments includes retrieving a previously assigned cost value from local cache.

19. The system of claim 11, wherein the one or more processors are further configured to assign at least a second one of the any assigned cost values for a second given lane segment of the set of lane segments includes generating a new value based on the destination.

20. The system of claim 11, further comprising the vehicle.

\* \* \* \* \*

UNITED STATES PATENT AND TRADEMARK OFFICE
CERTIFICATE OF CORRECTION

PATENT NO. : 10,691,131 B2
APPLICATION NO. : 16/029922
DATED : June 23, 2020
INVENTOR(S) : Nathaniel Fairfield and Joshua Seth Herbach It is certified that error appears in the above-identified patent and that said Letters Patent is hereby corrected as shown below:

In the Claims

Claim 4, Column 17, Lines 50 and 51:
Now reads: "whether to pass the vehicle"; should read -- whether to pass the object --

Claim 14, Column 18, Lines 35 and 36:
Now reads: "whether to pass the vehicle"; should read -- whether to pass the object --

Signed and Sealed this
Twenty-second Day of November, 2022

*Katherine Kelly Vidal*

Katherine Kelly Vidal
*Director of the United States Patent and Trademark Office*